United States Patent [19]

Conachen

[11] Patent Number: 5,253,400
[45] Date of Patent: Oct. 19, 1993

[54] MOTORIZED GUIDE FOR GROUTING AND SAWING WINDOW SASHES

[76] Inventor: James A. Conachen, 12 Meadow Rd., Sharon, Mass. 02067

[21] Appl. No.: 934,857

[22] Filed: Aug. 24, 1992

[51] Int. Cl.$^5$ .............. B23P 6/00; B26D 1/18; G05G 11/00; B23C 3/00
[52] U.S. Cl. ............................ 29/55; 29/402.08; 74/479 PH; 83/488; 83/745; 144/1 R; 409/178
[58] Field of Search .............. 29/55, 56.5, 59, 402.08, 29/426.4, 558; 74/479 PH; 83/486, 488, 631, 743, 745; 144/1 R, 3 R, 134 D, 136 C, 367; 409/175, 178, 182, 189, 190, 191, 197

[56] References Cited

U.S. PATENT DOCUMENTS

| | | | |
|---|---|---|---|
| 1,825,684 | 10/1931 | Trosh | 409/202 |
| 2,113,016 | 4/1938 | Demers | 409/178 |
| 3,557,659 | 1/1971 | Harris | 409/178 |
| 4,102,245 | 7/1978 | Cousins | 409/178 |
| 4,566,346 | 1/1986 | Petiteau | 74/479 PH |
| 4,787,786 | 11/1988 | Freud et al. | 409/178 |
| 4,830,555 | 5/1989 | Conachen | 409/178 |
| 4,995,277 | 2/1991 | Yanagisawa | 74/479 PH |
| 5,106,243 | 4/1992 | Hunt | 409/178 |

*Primary Examiner*—William E. Terrell
*Attorney, Agent, or Firm*—Donald W. Meeker

[57] ABSTRACT

Horizontal motorized drive rods in an upright rectangular frame control the movement of vertical guide rods in the X direction of the frame. Motorized guide rods move a router on a movable mount along the Y direction. A plungeable router, spring-mounted on the guide rods, is moved adjustably into the plane in the Z direction. The router removes glazing from a window sash and cuts deeper into the rabbit joint of the sash to allow double pane glass to be inserted into the sash. A rotary saw, with blade depth adjustment is swivel mounted to another vertical guide for cutting a slot in both vertical and horizontal rabbit joints to receive glazing beads. Pins rigidly mounted in front of and behind the cutting edges of the rotary saw blade act as guides and stops for the saw. Horizontal threaded rods with opposing right and left threads on either side of the center of the horizontal rod forms a centering device. A pair of depressable spring-loaded stops are equally spaced from the center of the rod, and a crank moves the stops reversibly. Sashes are centrally mounted on the frame using a sash centering device. A rotary saw slidably mounted on a vertical guide is positioned by a guide centering device. Equal amounts are cut off each side of a sash using a rotary saw. A spring-loaded pulley or counterweight is strung from the top of the vertical bar and connected to the cutting tools to help support them. The frame is adjustable to be mounted on various sized window frames or to allow sashes of various sizes and shapes to be mounted on the frame between clamp members on the frame.

23 Claims, 2 Drawing Sheets

MOTORIZED GUIDE FOR GROUTING AND SAWING WINDOW SASHES

BACKGROUND OF THE INVENTION

1. Technical Field

The present invention relates to a motorized guide for grouting and sawing devices, which by a first operation removes glazing from a window sash, thereby allowing removal of the original glass, and which by a second operation grouts out the rabbit joint of a sash to allow insertion of double pane glass, and which by a third operation cuts grooves in the rabbit joints to receive glazing beads, and which by a fourth operation saws the sides of the sash equally using a centering device. The present invention is designed to operate in a vertical position mounted on a window frame (for the first two operations only), or mounted on a separate rack holding the window vertically (for all four operations).

2. Background Art

Conserving energy (while maintaining a comfortable environment) is an important consideration of a building owner. Large amounts of heat (in the winter) and cool air (in the summer) are lost because of single pane glass in the windows. This energy loss is increased when the glazing becomes old and brittle leaving cracks between the glass and the sash. Considerable drafts can also result from sashes which are loose in their tracks and not properly insulated. Reduction of energy loss via windows is desirable.

Removing the old windows and replacing them with new windows is expensive and may not be cost effective. Maintaining original window design and character is usually not possible by replacing the original windows with new ones or covering the original with storm windows.

Removing the old glazing by a hand tool often results in damage to the sash or in the worker hurting his hand.

Removing the old glazing by a tool such as a router requires a guide to avoid harm to the sash. Previous guides allow the router to be used in only one direction along a straight line. The guide must then be moved to allow the router to be used in another direction. Requiring the guide to be constantly moved is time consuming. Pins or other sharp objects are commonly used to hold the guide in position and these objects often harm the sash or window frame. Curved sashes are difficult to grout as previous guides allow the router to be used only in a straight line.

Heavy tools which are guided by hand can create considerable strain on the arms and back of the user leading to fatigue and possible imprecise operation causing errors in the work. Vertically lifting and supporting tools against the force of gravity can be very tiring and also lead to imprecise operation caused by the strain and fatigue. Speed of operation may also be impeded by relying on hand operation.

In cutting slots in rabbit joints with a rotary saw, there is a danger of overcutting, thereby damaging the edges of the frame.

Hand-guided saw cuts on the sides of window sashes are often imprecise, leading to imperfections and unevenness in the cut surfaces allowing drafts to pass through such uneven surfaces.

Trimming work evenly on two opposite parallel surfaces is difficult when measuring and cutting by hand. Maintaining smooth parallel centered surfaces is very difficult without mechanical guiding means.

DISCLOSURE OF THE INVENTION

A vertically mounted motorized guide device for grouting and sawing tools, controlled in X, Y and Z coordinates, adapts to clamp onto window frames of various sizes and to receive window sashes of various sizes clamped onto the device. The guide device performs four operations to insulate existing windows while retaining the original character of the windows. It guides a grouter for (1) removing old glazing compound to remove the single-pane glass and (2) deepening the rabbit joint to receive double-pane glass. It guides a rotary saw for (3) cutting a slot in the rabbit joint to receive glazing beads. It acts as a centering device (with the sash mounted on the guide device) to guide a rotary saw for (4) trimming the sides of the window sash equally to accommodate weatherized tracks between the window frame and the sash. Motorization permits these operations to be performed quickly, easily and accurately without strain on the operator.

The first operation (removing old glazing compound) is performed without harming the sash, glass, or operator. If the original glass is double-pane glass, the glass is then replaced, if necessary, and the new glazing applied. If the original glass is not double-pane glass, the second operation is performed upon the sash by the cutting tool as guided by the guide system again without harming the sash or operator. In this second operation, the rabbit joint is made deeper by grouting to allow insertion of double-pane glass.

In both operations, precision cutting is required and obtained using the motorized guide device. Once the guide device is properly positioned, it remains in position throughout both operations with guide members moving to allow the X-Y-Z coordinates of the cutting tool to be changed to follow the sash even if the sash is curved. A router tool guide frame having both vertical and horizontal bars along which to slide the router tool permits full flexibility of movement over the full plane of the window in any direction or movement pattern: horizontal, vertical, angled or arched. Motorizing the vertical and horizontal bars transforms them into smooth drive rods for greater ease and precision. A spring mounted adjustable plungeable router allows changes in the Z-coordinate perpendicular to the glass to be performed quickly and easily, particularly with adjustment in depth which must be made between the upper and lower panes in a double hung sliding window. For applications where the outside of the wood grills are not cut and just the glazing putty holding the glass is removed for reglazing and painting, a router must move in the Z-direction easily and return to the original setting quickly.

The guide device is held in position by blocks of resilient material extending from the guide device. These blocks securely hold the guide device in position without harming the window frames or other surfaces to which they are secured.

A spring-loaded pulley or counterweight is strung from the top of the vertical bar and connected to the cutting tools to hold them up, thereby eliminating strain and fatigue for the operator and allowing greater precision because of the ease of moving the tools.

Pins rigidly mounted in front of and behind the cutting edges of the rotary saw blade act as guides and stops for the saw, thereby preventing overcutting and avoiding damage to the edges of the window frame as the saw cuts slots in the rabbit joint to receive the glazing beads.

Horizontal drive rods with opposing right and left threads on either side of the center of the horizontal rod act as centering devices to control the movement of a pair of adjustable stops on each horizontal drive rod. One centering rod mounted on a clamp for the sash centers the sash within the clamp. The other centering rod controls the horizontal limits of movement of the saw guide to insure equal cuts on both edges of the sash. These centering devices enable sashes to be trimmed accurately and evenly on both sides maintaining smooth parallel centered surfaces to insure an airtight fit with weatherized tracks installed in the window frame.

By providing positive gripping clamps and locking devices around each frame element of the guide system, the present invention operates by attaching the guide device vertically on a window frame in place on a building or vertically on a separate frame holding the window. The vertical orientation provides ease of operation by standing in front of the window to reach easily in all directions, saving back injury and back pain.

BRIEF DESCRIPTION OF THE DRAWINGS

These and other details and advantages of my invention will be described in connection with the accompanying drawings, which are furnished only by way of illustration and not in limitation of the invention, and in which drawings.

BEST MODE FOR CARRYING OUT THE INVENTION

Figure 1:
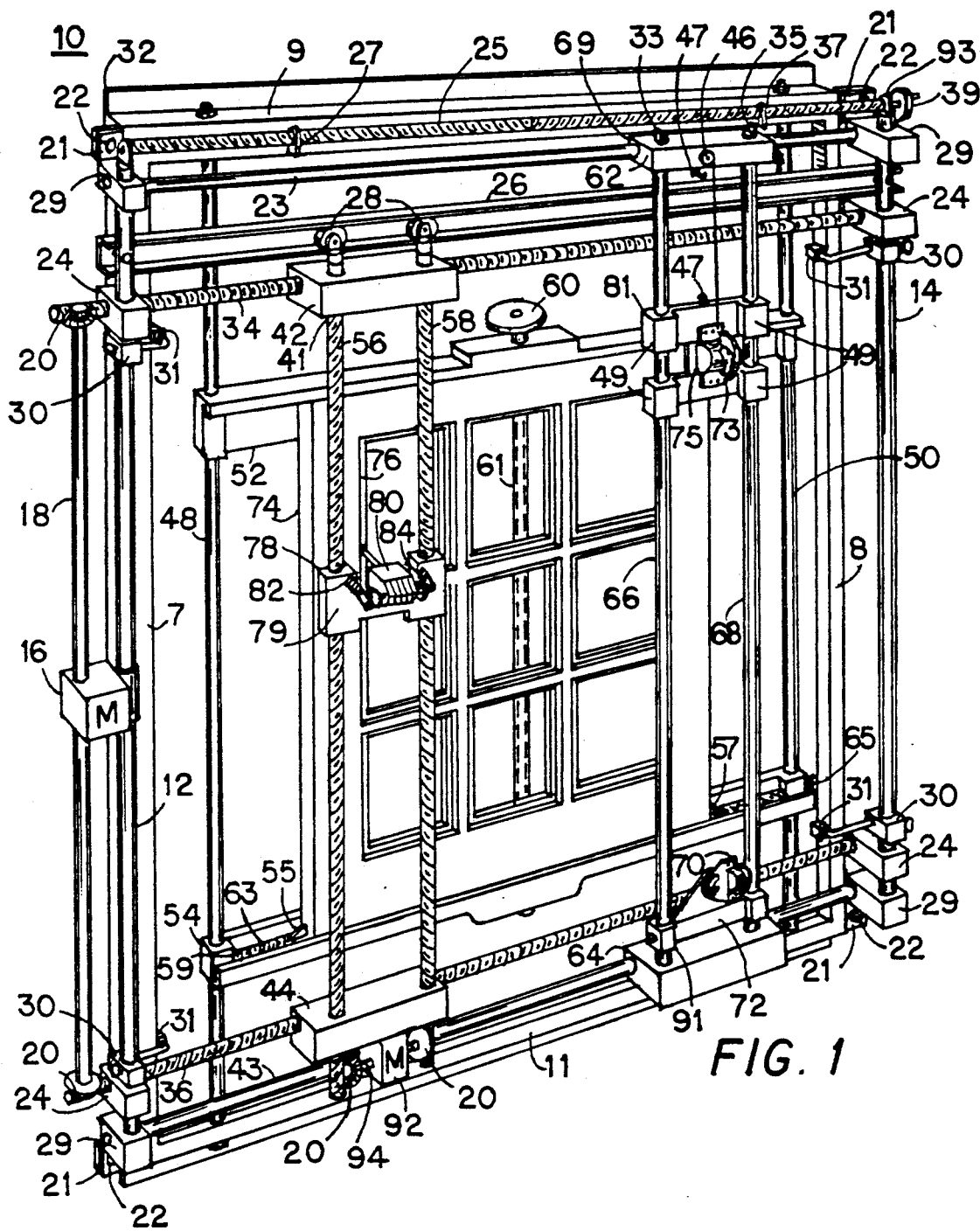
FIG. 1 is a front elevational view showing the invention with a window sash mounted on it.

FIG. 1 shows a motorized guide device 10 for cutting tools to reglaze and weatherize a window sash 74. The device comprises an adjustable rectangular frame which includes two vertical frame members 12 and 14 and two horizontal frame members 34 and 36 positioned between and substantially perpendicular to the vertical frame members thereby forming the adjustable rectangular frame. Connecting means 24 rotatably connect the horizontal frame members to the vertical frame members at each of four corners formed by intersection of the vertical and horizontal members. The connecting means could be formed from any rigid elements having circular openings at right angles to receive the vertical and horizontal frame members.

A rigid rectangular frame 32 has two parallel vertical members 7 and 8 and two parallel horizontal members 9 and 11 rigidly connected to form a rectangular shape. A pair of parallel rigid vertical rod members 48 and 50 is secured between the horizontal members with each parallel rigid rod member adjacent to a vertical member of the sash clamping frame. A parallel pair of long L-shaped clamp members 52 and 54 is slidably attached to the rigid vertical rod members 48 and 50, perpendicular to the rigid vertical rod members. A power track 61 connects the two L-shaped clamp members 52 and 54. The power track comprises a shaft enclosing a movable track and a power wheel 60 which causes the track to move. Turning the power wheel in one direction causes the L-shaped clamp members to move closer together to clamp a sash 74 inbetween, and moving the power wheel in an opposite direction causes the L-shaped clamp members to move further apart to release the sash 74.

A securing means 30 is attached to the frame at each of four corners of the adjustable rectangular frame for removably and vertically securing the adjustable rectangular frame reversibly to a window frame on a building and to the rigid vertical rectangular frame 32. Adjustable blocks of resilient material 31 with clamps on the securing means 30 enable the adjustable frame to be secured by tension. Bolts 22 from the rigid frame 32 may also be secured through plates 21 attached to vertical frame members 12 and 14 at connecting means 29.

The horizontal frame members 34 and 36 are rigid cylindrical rods threaded along their length. A single threaded rod could be used as a drive, but two threaded rods produce a more even movement. The threaded rods 34 and 36 fit rotatably in the connecting means 24. The guide means 41 is movably connected to the horizontal frame members 34 and 36 by housing 42 and 44 respectively. In this case the guide means are mounted vertically between the horizontal frame members 34 and 36, but they could also be mounted horizontally between the vertical members 12 and 14.

Figure 2:
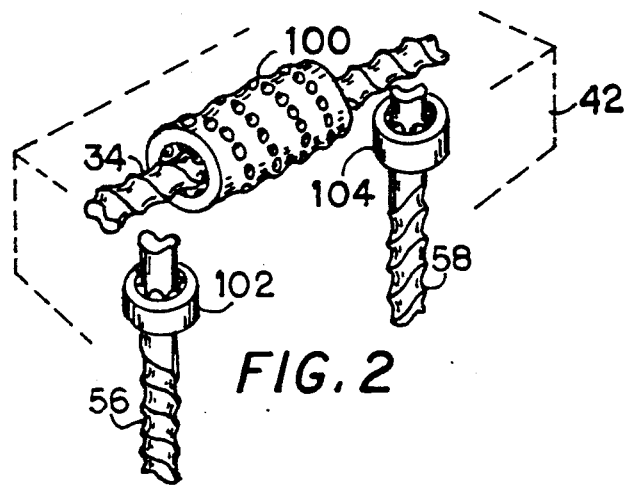
FIG. 2 is an enlarged partial perspective view of ball bearing collars connecting a guide housing to a drive rod.

In FIG. 2, the interior workings of housing 42, similar to housing 44, has a ball bearing collar 100 encircling the horizontal threaded rod 34 and bushings 102 and 104 encircling threaded guide rods 56 and 58. The ball bearings spirally arranged within the ball bearing collar 100 fit within the threads of each threaded rod to cause movement of the ball bearing collars reversibly along the threaded rods as the rods are rotated clockwise and counterclockwise.

To drive the guide means, a motor 16 is connected to the adjustable frame on vertical member 12. A drive train reversibly turns the two threaded rods 34 and 36 simultaneously thereby causing the guide means 41 to move reversibly along the threaded rods. A drive shaft 18 may be used to turn worm gears 20 and rotate the horizontal threaded shafts 34 and 36 or a chain and sprockets (not shown) may be substituted as a drive means.

The guide means 41 comprises a pair of parallel rigid cylindrical rods 56 and 58. The rods are threaded along their length. The threaded guide rods 56 and 58 fit rotatably at each end within a housing 42 and 44. A second motor 92, secured to the lower housing 44, rotates the threaded guide shafts 56 and 58 simultaneously by means of a drive shaft 94 and worm gears 20 or a chain and sprockets (not shown) thereby moving the cutting tool holding member 78 reversibly along the guide means.

A tool holding plate 79 is movably connected to the threaded guide rods 56 and 58 by ball bearing collars similar to the collar shown in FIG. 2. As the second motor 92 rotates the threaded guide rods 56 and 58 reversibly the tool holding plate 79 moves up and down the guide rods.

Figure 3:
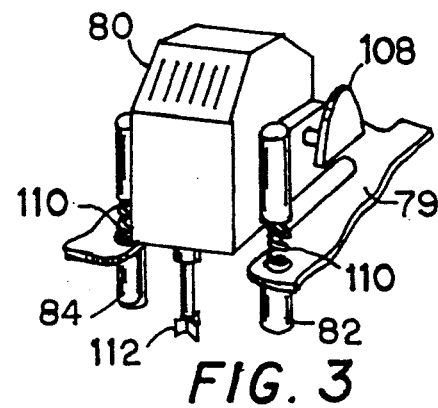
FIG. 3 is an enlarged partial perspective view of a plungeable router spring-mounted on a cutting tool holding member.

In FIG. 3 the tool receiving means comprises a pair of cylindrical receptacles 82 and 84 rigidly mounted on the cutting tool holding plate 79 to form a receptacle for a pair of springs 110 adjustably attached between the cylindrical receptacle and the cutting tool, a plungeable router 80 in this case. This spring connected tool receiving means enables the router 80 to be moved adjustably by handles 108 to a desired distance perpendicular to the plane of the adjustable rectangular frame allowing the router blade 112 to contact work surfaces at various distances, where it can be secured at the desired distance. The plungeable router 80 removes old glazing compound to remove the old single pane glass and routes deeper into the rabbit joints 76 to accommodate a double-paned insulating glass.

A C-shaped rigid beam 26 is rigidly secured to the tops of the two vertical frame members 12 and 14 to form a track along the top of the motorized guide device. At least one roller 28 is securely attached to a top end of the rods of the guide device. The roller 28 or wheel fits into the track formed by the C-shaped rigid beam 26, thereby supporting the weight of the guide device 41 as it moves along the track, helping to prevent sagging of the horizontal rods which could lead to inaccuracy.

A pair of parallel horizontal smooth cylindrical rods 23 and 43 are rigidly attached to the vertical frame members 12 and 14 along extensions of the vertical frame members above and below the first horizontal frame members 34 and 36, respectively. A second guide means 69 is movably connected to the smooth rods by housings 62 and 64. The second guide member comprises a pair of rigid cylindrical rods 66 and 68 forming second guide rods movably mounted in a vertical orientation between the two smooth horizontal rods 23 and 43 and perpendicular to the horizontal frame members.

Figure 4:
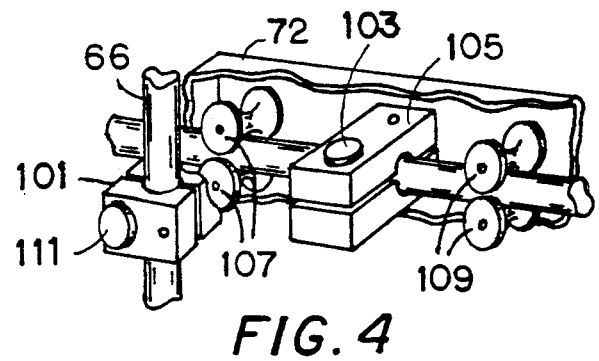
FIG. 4 is an enlarged partial perspective view showing grooved rollers connecting a second guide housing to a smooth rod.

In FIG. 4 the housing 62 for the second guide means has two pair of grooved rollers 107 and 109 riding on the horizontal smooth rod 23 and a clamp 105 with a knob 103 for tightening the clamp around the smooth rod 23. A clamp 101 with tightening knob 111 around vertical guide rod 66 and another clamp around the other parallel guide rod 68 (not shown) hold the guide rods 66 and 68 rigidly in place while the guide housing 62 moves reversibly along the smooth horizontal rod 23.

The upper tool holding means on the second guide means 81 comprises a rigid plate 75 having two rigidly connected flanges each with a pair of ball bearing bushings 49 movably secured around the smooth guide rods 66 and 68. Chrome rods and ball bearings insure accurate movement. The upper cutting tool 73 is a rotary saw rigidly attached to the cutting tool holding plate 75. A spring loaded metal band pulley 46 is attached to the top housing 62 of the second guide means. An end of the metal band attaches to the rotary saw to help support it. Alternately, a weight on a cord and pulley (not shown) may be attached to the top housing of the second guide means, wherein an end of the cord attaches to the rotary saw to help support it.

A spring loaded clip 47 is attached to the top housing 62 of the second guide means to engage the rotary saw and hold it when not in use. When the clip 47 is released, the rotary saw 73 slides down the smooth guide rods to trim sash sides evenly and smoothly on two opposite parallel sides of a sash to accommodate a weatherized air-tight track between the window frame and the sash.

A guide centering device 93 is mounted above the upper smooth horizontal rod 23 parallel to the horizontal frame members and perpendicular to the guide rods for limiting the movement of the second guide member 69 to position a cutting tool into at least two operating positions which are equidistant from the center of the centering guide device. The guide centering device comprises a rigid centering rod 25 extending horizontally rotatably connected to a top portion of the first and second vertical frame members 12 and 14. At one end of the guide centering rod 25 is a rigidly connected crank 39 for turning the guide centering rod. The guide centering rod is threaded from the center of the rod outwardly with right screw threads in one direction and left screw threads in the opposite direction. A depressable spring-loaded guide centering stop 27 and 37 is mounted on each side of the center of the guide centering rod evenly spaced from the center. Turning the crank 39 rotates the guide centering rod 25 causing each of the guide centering stops 27 and 37 to move along the threads of the rod an equal distance from the center to stop the second guide member 69 and position a cutting tool.

On the top of each smooth guide rod 66 and 68 stop engaging tabs 33 and 35 are rigidly attached to engage the stops 27 and 37 respectively to stop the panel saw in positions equidistant from the center of the centering rod 25 to insure even cuts on both sides of the sash 74.

A sash centering means 59 comprises a sash centering rod 63 mounted rotatably on one of the L-shaped clamping members 54 parallel to the L-shaped clamping member. A crank 65 turns the sash centering rod. The sash centering rod 63 is threaded from the center of the rod outwardly with right screw threads in one direction and left screw threads in the opposite direction. One depressable spring-loaded sash centering stop 55 and 57 is mounted on each side of the center of the sash centering rod evenly spaced from the center. Turning the crank 65 rotates the sash centering rod 63 causing each of the sash centering stops 55 and 57 to move along the threads of the rod an equal distance from the center and each sash centering stop engages a side of a window sash 74 to center the sash. The guide centering device 93 and the sash centering device 59 together insure that the sash will be trimmed evenly and accurately on both sides of the sash to provide an airtight fit with a weatherized track on the window frame.

Figure 5:
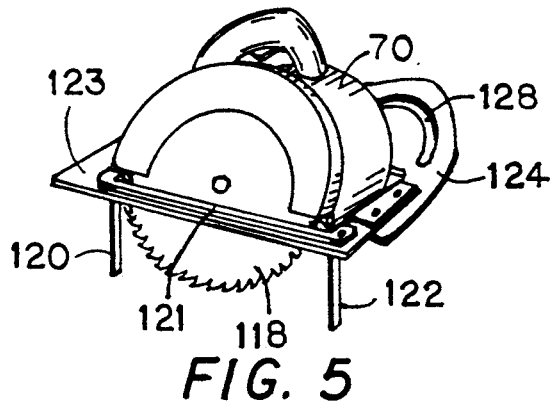
FIG. 5 is an enlarged perspective view showing a rotary saw with guide pins mounted on a swivel plate.
Figure 6:
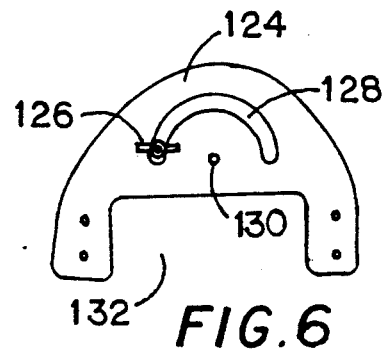
FIG. 6 is a plan view of the swivel plate.

In FIGS. 5 and 6 a lower cutting tool mounting means 91 comprises a swivel plate 124 adjustably attached to the cutting tool holding member 72 (FIG. 1) to permit rotation of the cutting tool (in this case, rotary saw 70) within the plane of the adjustable rectangular frame. A semicircular slot 128 on the swivel plate 124 admits a bolt from the tool holding member. The swivel plate may be turned to the desired angle and secured in place by a thumb screw 126. The rotary saw is moved adjustably to a desired distance perpendicular to the plane of the adjustable rectangular frame by adjusting the depth of the saw blade 118 relative to the saw guide plate 123.

The rotary saw 70 of FIG. 5 further comprises a pair of guide pins 120 and 122 connected by a rigid bar 121 securely attached to the rotary saw by screws or rivets. One guide pin 122 is positioned directly in front of the cutting edge of the rotary blade 118 and the other guide pin 120 is positioned directly behind the cutting edge of the rotary blade to prevent overcutting in cutting slots in the rabbit joints 76 on window sashes. The guide pins position the blade of the saw away from the window frame adjacent to the rabbit joint 76. The swivel plate 124 enables the rotary saw to be turned vertically and horizontally to work on all of the rabbit joints in a sash. The rotary saw 70 cuts slots in rabbit joints to receive the glazing beads for retaining the double-pane glass.

The cutting tools may be moved over the entire vertical plane (X and Y directions) because of combined vertical and horizontal movement and also over a wide range of distance in the Z direction toward the work because of the spring connection as well as adjustments of the tools themselves. They may be operated at any angle or over any curved surface as in the case of arched windows.

It is understood that the preceding description is given merely by way of illustration and not in limitation of the invention and that various modifications may be made thereto without departing from the spirit of the invention as claimed.

I claim:

1. A motorized guide device for cutting tools to reglaze and weatherize a window sash, the device comprising:

an adjustable rectangular frame including
first and second vertical frame members, and
first and second horizontal frame members positioned between and substantially perpendicular to the first and second vertical frame members thereby forming the adjustable rectangular frame;
connecting means rotatably connecting the vertical frame members to the horizontal frame members at each of four corners formed by intersection of the vertical and horizontal members;
a guide means movably mounted between two opposing frame members parallel to the plane of the rectangular frame; wherein the guide means is mounted in a vertical orientation between the two horizontal frame members and the motorized guide device further comprises a C-shaped rigid beam rigidly secured to the tops of the two vertical frame members to form a track along the top of the motorized guide device, and at least one roller securely attached to a top end of the guide means, which roller fits into the track formed by the C-shaped rigid beam thereby supporting the weight of the guide means as it moves along the track;
a first motorized means which provides the power for moving the guide means reversibly along the two opposing frame members;
a cutting tool holding member movably mounted to the guide means to provide motion along the guide means;
a cutting tool mounting means on the cutting tool holding member that enables adjustable movement of the cutting tool in a direction perpendicular to the plane of the adjustable rectangular frame;
secured to the adjustable rectangular frame, a rigid vertical rectangular frame having a window sash clamping means;
a securing means attached to the frame at each of four corners of the adjustable rectangular frame for removably and vertically securing the adjustable rectangular frame reversibly to a window frame on a building and to the rigid vertical rectangular frame.

2. The invention of claim 1 wherein the rigid vertical rectangular frame having a window sash clamping means comprises:

a rigid rectangular frame having two parallel vertical members and two parallel horizontal members rigidly connected to form a rectangular shape;
a pair of parallel rigid rod members secured between the horizontal members with each parallel rigid rod member adjacent to a vertical member of the sash clamping frame;
a parallel pair of long L-shaped clamp members slidably attached to the rigid rod members perpendicular to the rigid rod members;
a power track connecting the two L-shaped clamp members, wherein the power track comprises a shaft enclosing a movable track and a power wheel which causes the track to move, wherein turning the power wheel in one direction causes the L-shaped clamp members to move closer together to clamp a sash inbetween and moving the power wheel in an opposite direction causes the L-shaped clamp members to move further apart to release the sash.

3. A motorized guide device for cutting tools to reglaze and weatherize a window sash, the device comprising:

an adjustable rectangular frame including
first and second vertical frame members, and
first and second horizontal frame members positioned between and substantially perpendicular to the first and second vertical frame members thereby forming the adjustable rectangular frame;
connecting means rotatably connecting the vertical frame members to the horizontal frame members at each of four corners formed by intersection of the vertical and horizontal members;
a guide means movably mounted between two opposing frame members parallel to the plane of the rectangular frame;
a first motorized means for moving the guide means reversibly along the two opposing frame members;
a cutting tool holding member movably mounted to the guide means to provide motion along the guide means;
a cutting tool mounting means on the cutting tool holding member that enables adjustable movement of the cutting tool in a direction perpendicular to the plane of the adjustable rectangular frame;
secured to the adjustable rectangular frame, a rigid vertical rectangular frame having a window sash clamping means; wherein the rigid vertical rectangular frame having a window sash clamping means comprises a rigid rectangular frame having two parallel vertical members and two parallel horizontal members rigidly connected to form a rectangular shape; a pair of parallel rigid rod members secured between the horizontal members with each parallel rigid rod member adjacent to a vertical member of the sash clamping frame; a parallel pair of long L-shaped clamp members slidably attached to the rigid rod members perpendicular to the rigid rod members; and a power track connecting the two L-shaped clamp members, wherein the power track comprises a shaft enclosing a movable track and a power wheel which causes the track to move, wherein turning the power wheel in one direction causes the L-shaped clamp members to move closer together to clamp a sash inbetween and moving the power wheel in an opposite direction causes the L-shaped clamp members to move further apart to release the sash;

a securing means attached to the frame at each of four corners of the adjustable rectangular frame for removably and vertically securing the adjustable rectangular frame reversibly to a window frame on a building and to the rigid vertical rectangular frame.

4. The invention of claim 1 wherein the opposing pair of frame members to which the guide means is mounted in the adjustable frame is a first pair of parallel rigid cylindrical rods at least one of which is threaded along its length and the threaded rod fits rotatably in the connecting means, and wherein the guide means is movably connected to the threaded rod by a movable housing means, and wherein the first motorized driving means comprises:

a first motor connected to the adjustable frame and first drive train means to reversibly turn the threaded rod thereby causing the connecting means to move reversibly along the first pair of rigid cylindrical rods.

5. The invention of claim 4 wherein the movable housing means comprises a ball bearing collar, including spiral mounted ball bearings, encircling the threaded rod, with the ball bearings fitting within the threads, so that as the threaded rod turns the movable housing means moves along the threaded rod.

6. The invention of claim 4 wherein the first drive train means comprises a drive shaft from the first motor interconnected to the threaded rod by a gear.

7. The invention of claim 4 wherein the first drive train means comprises a chain drive from the first motor interconnected to the threaded rod by a sprocket.

8. The invention of claim 4 wherein the guide means comprises a second pair of parallel rigid cylindrical rods forming guide rods, perpendicular to the first pair of cylindrical rods, and connected to the cylindrical rods by a movable housing, wherein at least one of which guide rods is threaded along its length to form a threaded guide rod, and the threaded guide rod fits rotatably at each end within the housing, and wherein the cutting tool holding member includes a movable tool-holding housing means, and wherein the invention further comprises a second motorized means for moving the cutting tool holding member reversibly along the guide means, the second motorized driving means comprises:

a second motor connected to one of the housings and second drive train means to reversibly turn the threaded guide rod, thereby causing the tool holding member to move reversibly along the guide rods.

9. The invention of claim 8 wherein the movable tool-holding housing means comprises a ball bearing collar, including spiral mounted ball bearings, encircling the threaded guide rod, with the ball bearings fitting within the threads, so that as the threaded rod turns the movable tool-holding housing means moves along the threaded guide rod.

10. The invention of claim 8 wherein the second drive train means comprises a drive shaft from the second motor interconnected to the threaded guide rod by a gear.

11. The invention of claim 8 wherein the second drive train means comprises a chain drive from the second motor interconnected to the threaded guide rod by a sprocket.

12. The invention of claim 8 wherein the cutting tool mounting means comprises:

a pair of cylindrical receptacles rigidly mounted on the cutting tool holding member, wherein a pair of springs are adjustably attached between the cylindrical receptacle and the cutting tool enabling the cutting tool to be moved adjustably to a desired distance perpendicular to the plane of the adjustable rectangular frame.

13. The invention of claim 12 wherein the cutting tool is a plungeable router.

14. The invention of claim 8 wherein the guide means is mounted in a vertical orientation between the two horizontal frame members and the motorized guide device further comprises:

a C-shaped rigid beam rigidly secured to the tops of the two vertical frame members to form a track along the top of the motorized guide device;

at least one roller securely attached to a top end of the guide device, which roller fits into the track formed by the C-shaped rigid beam thereby supporting the weight of the guide device as it moves along the track.

15. The invention of claim 1 further comprising a second guide means, wherein the second guide means comprises a pair of rigid cylindrical rods forming second guide rods movably mounted in a vertical orientation between the two horizontal frame members and perpendicular to the horizontal frame members, wherein at least one cutting tool is mounted on the cutting tool holding member of the second guide means, and wherein the invention further comprises a guide centering device parallel to the horizontal frame members and perpendicular to the guide rods for limiting the movement of the second guide means to position a cutting tool into at least two operating positions which are equidistant from the center of the centering guide device.

16. The invention of claim 15 wherein the guide centering device comprises a rigid centering rod extending horizontally rotatably connected to a top portion of the first and second vertical frame members, a crank means for turning the guide centering rod, and wherein the guide centering rod is threaded from the center of the rod outwardly with right screw threads in one direction and left screw threads in the opposite direction, and wherein a guide centering stop is mounted on each side of the center of the guide centering rod evenly spaced from the center, so that turning the crank means rotates the guide centering rod causing each of the guide centering stops to move along the threads of the rod an equal distance from the center to stop the second guide means and position a cutting tool.

17. The invention of claim 16 further comprising a sash centering means consisting of a sash centering rod mounted rotatably on one of the L-shaped clamping members parallel to the L-shaped clamping member and a crank-means for turning the sash centering rod, wherein the sash centering rod is threaded from the center of the rod outwardly with right screw threads in one direction and left screw threads in the opposite direction, and wherein one sash centering stop is mounted on each side of the center of the sash centering rod evenly spaced from the center, so that turning the crank means rotates the sash centering rod causing each of the sash centering stops to move along the threads of the rod an equal distance from the center and each sash centering stop engages a side of a window sash to center the sash.

18. The invention of claim 17 wherein the cutting tool is a rotary saw rigidly attached to the cutting tool holding member which is slidably attached to the second guide means to trim a sash evenly on two opposite parallel sides of a sash.

19. The invention of claim 17 further comprising a spring loaded metal band pulley attached to a top housing of the second guide means, wherein an end of the metal band attaches to the rotary saw to help support it.

20. The invention of claim 17 further comprising a weight on a cord and pulley attached to a top housing of the second guide means, wherein an end of the cord attaches to the rotary saw to help support it.

21. The invention of claim 17 further comprising a clip attached to a top housing of the second guide means to engage the rotary saw and hold it when not in use.

22. The invention of claim 1 further comprising a second guide means, wherein the second guide means comprises a pair of rigid cylindrical rods forming second guide rods movably mounted in a vertical orientation between the two horizontal frame members and perpendicular to the horizontal frame members, wherein at least one cutting tool is mounted on the cutting tool holding member of the second guide means, wherein the cutting tool is a rotary saw with blade depth adjustment and the cutting tool mounting means comprises a swivel plate adjustably attached to the cutting tool holding member to permit rotation of the rotary saw within the plane of the adjustable rectangular frame.

23. The invention of claim 22 wherein the rotary saw further comprises a pair of guide pins attached to the rotary saw with one guide pin positioned directly in front of the cutting edge of the rotary blade and the other guide pin positioned directly behind the cutting edge of the rotary blade to prevent overcutting.

* * * * *